Oct. 5, 1965 N. A. FISCHER 3,210,482

PRESSURE PAD INSERT FOR TAPE CARTRIDGES

Filed April 13, 1964

INVENTOR
NORMAN A. FISCHER
BY Frank Groom Kirz
ATTORNEY

United States Patent Office 3,210,482
Patented Oct. 5, 1965

3,210,482
PRESSURE PAD INSERT FOR TAPE CARTRIDGES
Norman A. Fischer, 2610 Avie, Jennings 36, Mo.
Filed Apr. 13, 1964, Ser. No. 359,005
3 Claims. (Cl. 179—100.2)

Figure 1:
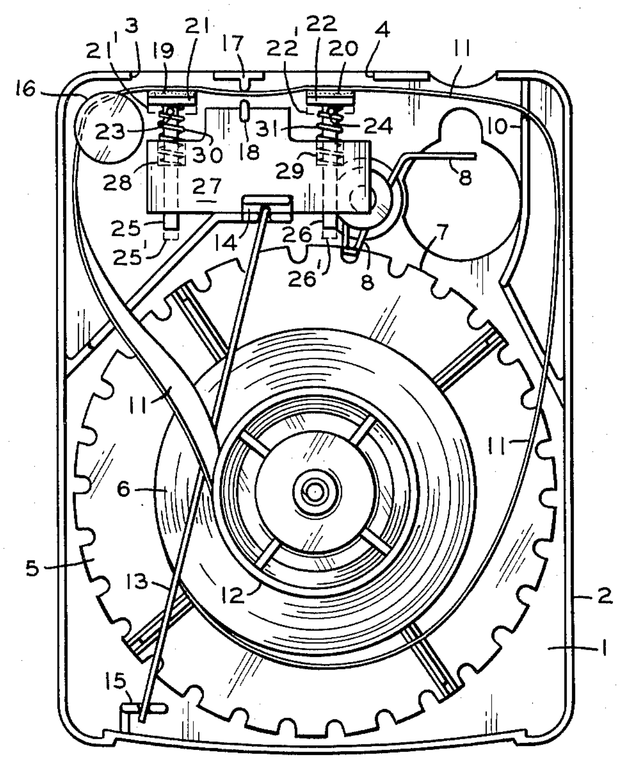

There has been an increasing use of magnetic tape cartridges in broadcasting in recent years. Their convenience has made possible a widespread application of the tape cartridge principle. However there has been one problem which has plagued all users of tape cartridges. This problem is the poor general quality of the reproduction of the sound. Manufacturers of the tapes have gone to extreme efforts to improve the recording materials. Manufacturers of the recording and broadcast equipment have refined their products endlessly. Still however the quality of the reproduced sound at the broadcast level is often below standard. Many agencies who place advertising in the form of broadcast commercials specify that tape cartridges must not be used. This is because the quality of the reproduction is lower than that obtainable by other methods available.

The result is confusion over objectives. The convenience to the broadcast engineer makes the tape cartridge the best choice. However the quality resulting from the most convenient cartridge leaves a great deal to be desired.

The basis of the poor quality of reproduction lies in the lack of accurate placing of the tape aginst the recording and pickup heads when the cartridge is being used. The tape and cartridge manufacturers both recognize this condition as a requirement for the finest reproduction. When the tape is maintained flat against the recording and pickup heads of the recording equipment, the finest type of reproduction results. However this is the exception and generally only occurs when the cartridge is new.

Many spring-operated expedients have been devised to maintain the tape against the recording and pickup heads, but they are all in general unsatisfactory. The reason, the inventor has found, is that they are not designed to hold the tape flat in the proper position against the heads when the tape cartridge is subjected to many uses and the spring devices have become old, and worn.

The principal object of the present invention is to provide a spring-operated pressure pad insert which will serve to render the present tape cartridges more efficient as sound reproducing aids. Prime to this object is the requirement that the pressure pads of the invention hold the tape in firm, flat, engagement against the record and pickup heads of the standard recording equipment with which the cartridges are used.

Another object of this invention is to provide a construction of the pressure pad insert for tape cartridges which is self-compensating, so that as the springs of the insert become weaker from usage they will yet be sufficiently strong to hold the tapes flat against the recording and pickup heads.

The flat engagement of the tape against the heads is the key to the matter, as I have repeatedly shown with experiments. In general I have found that the use of my cartridge insert raises the sound level some four decibels. This is actually an astounding result and is solely due to the fact that absolutely flat engagement between the tape and the heads is the vital requirement. I have taken many old tapes and put them in my cartridges equipped with my pressure pad inserts and measured the above change in sound levels. This is the new result of my invention and the result which distinguishes it over the prior art.

A still further object of my invention to modify cartridge construction is to offer a pad insert which will adapt the present construction so that the present cartridges will be better fitted for their task.

An additional object of my invention is to provide a pressure pad insert which will eliminate the familiar "blurp" noise which occurs when a spliced tape passes over the pickup head. With the construction which I provide there is no such noise when a spliced piece of tape passes the splice over the pickup head. There is no detectable noise from the splice. This is really another new result of my invention and results from the interaction of my construction with the spliced tape and the pickup head.

Additional objects and advantages of my invention will be obvious to those skilled in the art to which the invention pertains, from a study of the drawings and the accompanying specification.

The figure is a top plan view of a typical tape cartridge with my pressure pad insert in position.

In the FIGURE 1, the numeral 1 is given to the cartridge case. This case 1 is made of injection molded plastic and is provided with a side side wall 2. The side wall 2 is interrupted at 3 and 4, which are openings through which the recording and pickup heads of the recording apparatus project when the cartridge is in use.

There is also provided a tape wheel 5, which carries the coil of magnetic tape 6, and is free to rotate with the tape. The wheel 5 is provided with a series of peripheral ratchet teeth 7, which extend entirely around the perimeter of the wheel. These teeth engage with the spring brake 8, which is shown in FIGURE 1 in the braking position, in which it lies in the notched area between two ratchet teeth. The brake is similar to the pawl in action and prevents rotation of the wheel 5 by such braking, when the cartridge is not being played.

Numerals 9 and 10 are given to inner walls which cooperate with the magnetic tape strip 11.

The tape coil 6 is continuous. It is coiled around the central drum 12. The coil 6 is held down against the wheel 5 by the spring 13. Spring 13 is held in position by two injection molded projections 14 and 15, which are integral with the cartridge case 1.

The tape strip moves as it is unwound from the inner side of the coil next the drum 12. Then the tape passes over the spring 13 and around the plastic round projection 16. The tape strip 11 then passes between the two projections 17 and 18, located between the two recording and pickup head positions, 3 and 4, the openings previously described. The tape then passes around the inner wall 10 and back to be wound onto the outer side of the tape coil 6.

All of the above is entirely conventional and is to be found in such constructions as those outlined in Patents Nos. 2,778,635; 2,778,636; 2,778,637; 2,778,880 and in 2,876,005.

None of the above patents however illustrate a satisfactory method or construction for pressing the tape flat against the recording and pick-up heads and maintaining it there. In fact these patents and the cartridge manufacturers have not generally recognized what the problem is.

With my construction I provide a pair of pressure pads in the form of pads of felt 19 and 20. These are flat strips of felt, as wide or wider than the tape strip. The felt strips pads 19 and 20 are mounted on the hinged supports 21 and 22, by gluing or other means. Each hinged support is hinged by a hinge pin 23, 24 respectively, upon a pressure bearing rod 25, 26 respectively.

The pressure bearing rods 25, 26 are carried by the insert body. They project through holes in said insert body 27. The holes are counterbored at 28, 29. Disposed in said counterbores 28, 29 are the springs 30, 31 respectively.

The springs 30, 31 constantly urge the flat hinged supports 21, 22 outward and away from the insert body 27, by bearing against the rearward side of the said hinged supports.

The insert body 27 is maintained in position by being mounted between the projections 14 and 18. Of course it is obvious that the insert body could be molded integral with the cartridge in the first instance.

In action, the recording and pickup heads project through the openings 3 and 4 of the cartridge case 1. In this case the tape strip is trapped completely between the heads and the felt pads 19 and 20 mounted on the hinged supports 21 and 22, which move to the dotted line positions 21′ and 22′, while the pressure bearing rods 25 and 26 move to the dotted line positions 25′ and 26′ respectively.

This design for felt pad covered hinged supports has been the result of extensive experiment. If the hinge pins 23, 24 are omitted, and the mounting is not a hinged mounting, the tape may, and occasionally does become jammed or cocked against the recording and pickup heads. However the addition of the hinged support is for maximal operation. In this case the felt pads, the springs and the hinged supports combine to give complete and intimate sliding contacting between the heads and the tape strip 11.

The improvement in operation is striking. An old cartridge equipped with my insert, will give an output up to 4 or more decibels higher on the sound level. This entirely the result of the maximum contact. Optimizing the conditions for such contact results in giving the best output that the given tape is capable of, and is well within the requirements of the highest quality sound reproduction.

Because of the increased and maintained contact, no difficulty is obtained when working with spliced tape. Splices pass through the pickup head without producing the customary "blurp" familiar to recording engineers. In fact this is also a striking result of the invention, that tapes which have been repeatedly spliced will perform much better on this insert-equipped cartridge, which I describe, than in the familiar case.

All sorts of expedients have been tried to accomplish the results of my invention. Flat leaf springs have been tried, but when they become tired they tend to cock. Sponge rubber has been used but it tends to grip the tape and is in general unsatisfactory.

My invention has the following advantages. The springs never exert excessive pressures on the tape strip. They remain soft springs but throughout their working life, which is essentially the life of the cartridge, maintain the felt pads 19 and 20 in position pressing the tape strip 11 against the recording and pickup heads. The device is simple to assemble and cheap to produce efficiently.

It will be obvious from the above that many changes, variations and modifications are possible in my invention without departing from the scope of the invention. I do not intend to be limited by any other requirements than those expressed in the following claims.

What I claim is:

1. In a device of the class described, and provided with a cartridge case containing a continuous tape coil, and provided with openings for recording and pickup heads,
- an insert body integrally mounted with respect to said cartridge case,
- a pair of pressure bearing rods disposed reciprocably through said insert body in bores through said body,
- a spring-carrying counterbore around one end of each of said pressure bearing rods in said insert body,
- a flat hinged support on said end of each of said pressure bearing rods,
- a spring mounted in said counterbore around each of said pressure bearing rods between said hinged support and said insert body, to maintain a portion of said tape in flat engagement against said heads when said cartridge is in use.

2. In a device of the class described, and provided with a cartridge case containing a continuous tape coil, and provided with openings for recording and pickup heads,
- an insert body integrally mounted with respect to said cartridge case,
- a pair of pressure bearing rods disposed in bores through said body,
- flat hinged supports on one end of each pressure bearing rod,
- a flat felt pad on each hinged support to carry said continuous tape coil,
- a spring mounted in said insert body between said body and said hinged support to maintain a portion of said tape in flat engagement against said recording and pickup heads when said cartridge is in use.

3. In a device of the class described, and provided with a cartridge case containing a continuous tape coil, and provided with openings for cooperative recording and pickup heads,
- an insert body integrally mounted upon said cartridge case adjacent said openings for said heads,
- a pair of pressure bearing rods disposed upon and through said insert body in bores through said body,
- a hinge pin through each pressure bearing rod at said end adjacent said openings for said heads,
- a flat hinged support mounted upon each pressure bearing rod upon said hinge pin,
- a counterbore in said insert body, around each said pressure bearing rod adjacent said end carrying said flat hinged support,
- a spring mounted on each and around each pressure bearing rod between said insert body and said flat hinged support, one end of said spring being disposed in said counterbore in said insert body and the opposite end being secured in position by said hinge pin, and
- a flat felt pad on each hinge support to maintain a portion of said tape in flat engagement against said heads when said cartridge is in use.

References Cited by the Examiner

UNITED STATES PATENTS

| | | | |
|---|---|---|---|
| 3,078,464 | 2/63 | Lyon | 242—55.13 |
| 3,100,090 | 8/63 | Goodell | 242—55.13 |
| 3,111,282 | 11/63 | Proctor | 242—55.13 |

M. HENSON WOOD, Jr., *Primary Examiner.*

ROBERT B. REEVES, *Examiner.*